Jan. 1, 1924

H. J. CHANDLER

SAFETY DEVICE FOR PLANES

Filed Sept. 13, 1921

H. J. Chandler.
INVENTOR

BY Victor J. Evans.
ATTORNEY

WITNESSES:

Jan. 1, 1924

H. J. CHANDLER

SAFETY DEVICE FOR PLANES

Filed Sept. 13, 1921

H. J. Chandler.
INVENTOR

BY Victor J. Evans.
ATTORNEY

WITNESSES:

Patented Jan. 1, 1924.

1,479,696

UNITED STATES PATENT OFFICE.

HENRY J. CHANDLER, OF PLATTSMOUTH, NEBRASKA.

SAFETY DEVICE FOR PLANES.

Application filed September 13, 1921. Serial No. 500,289.

*To all whom it may concern:*

Be it known that I, HENRY J. CHANDLER, a citizen of the United States, residing at Plattsmouth, in the county of Cass and State of Nebraska, have invented new and useful Improvements in Safety Devices for Planes, of which the following is a specification.

This invention comprehends the provision of a safety device for aeroplanes or the like, and is in the nature of a parachute adapted to be attached to the plane, and including a hinged staff whereby the parachute proper may be arranged normally horizontal and held in this position against the tension of resilient means which is employed to automatically throw the parachute to a vertical position for use.

Another object of the invention resides in providing a device of the above mentioned character wherein the parachute is automatically opened after it has assumed a vertical position as above mentioned.

The nature and advantages of the invention will be better understood when read in connection with the accompanying drawings, the invention residing in the combination, construction, and arrangement of parts as claimed.

In the drawings forming part of this application, like characters of reference indicate similar parts in the several views and wherein.

Figure 1:
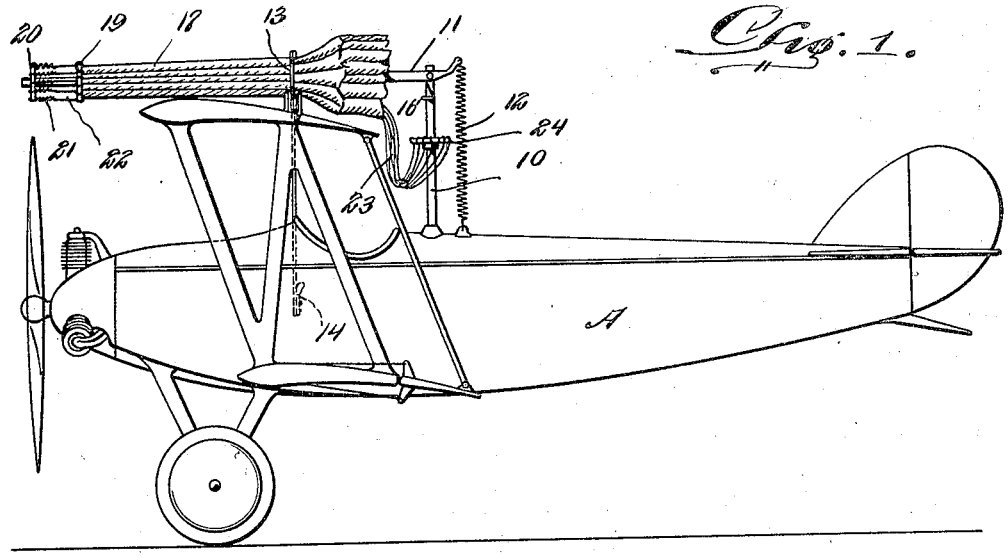
Figure 1 is a view showing the normal position of the parachute on an aeroplane.

Referring to the drawings in detail, A indicates generally an aeroplane with which the parachute is used.

Figure 2:
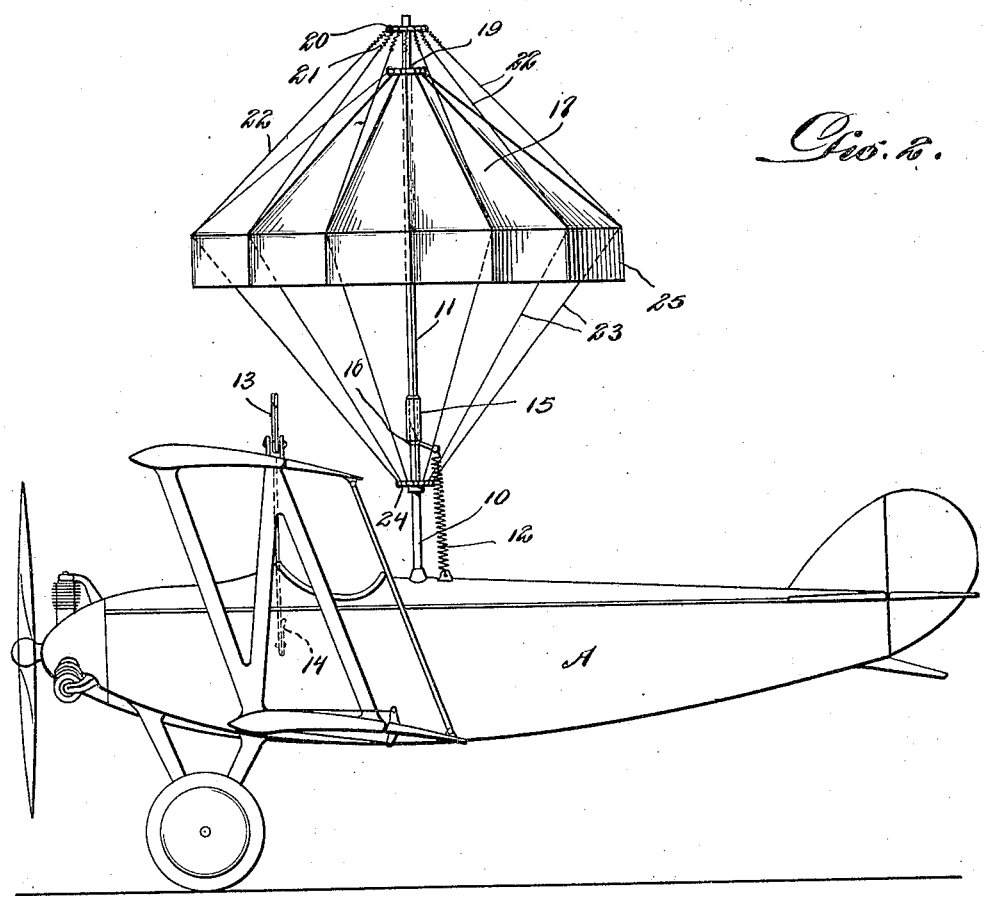
Figure 2 is a view showing the position of the parachute opened and in its vertical position.

The parachute comprises a staff made up of two hingedly connected sections 10 and 11 respectively, the former being secured rigidly to the aeroplane in any suitable manner and vertically disposed, while the section 11 supports the parachute proper and is arranged together with the latter normally in a horizontal position. Secured to the lower end of the section 11 is a coiled spring 12, the opposite end of this spring being secured to a fixed part of the plane, so that it is normally under tension, and it is utilized to automatically throw the hinged section 11 of the staff to a vertical position as shown in Figure 2 when use of the parachute is desired. The section 11 is normally maintained in a horizontal position against the influence of the spring 12, by means of a clamp 13, the latter being attached to a manually operated lever 14 arranged within convenient reach of the pilot, so that the section 11 may be released in quick order, to permit the spring 12 to function for the purpose above mentioned. Slidably mounted upon the section 11 is a sleeve 15 which automatically assumes a position to embrace the joint between the sections of the staff, after the section 11 has assumed a vertical position, thus holding the sections 10 and 11 fixed relatively. The section 10 carries a stop 16 to limit the downward sliding movement of the sleeve 15.

Figure 4:
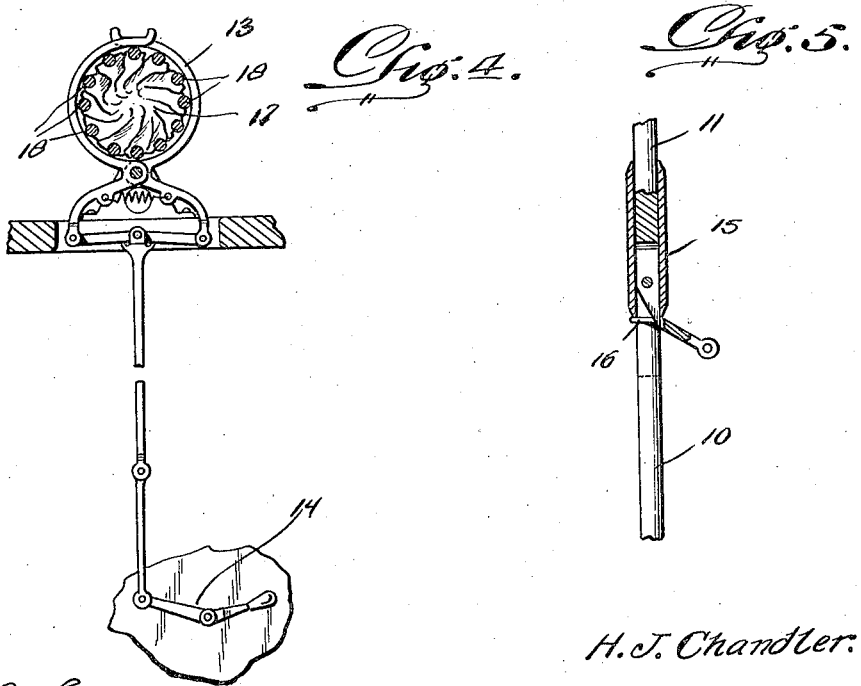
Figure 4 is a detail view of the clamp for normally holding the parachute positioned as in Figure 1.
Figure 5:
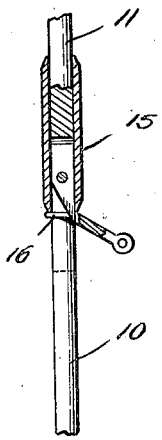
Fig. 5 is a detail view of the staff joint and coupling.
Figure 3:
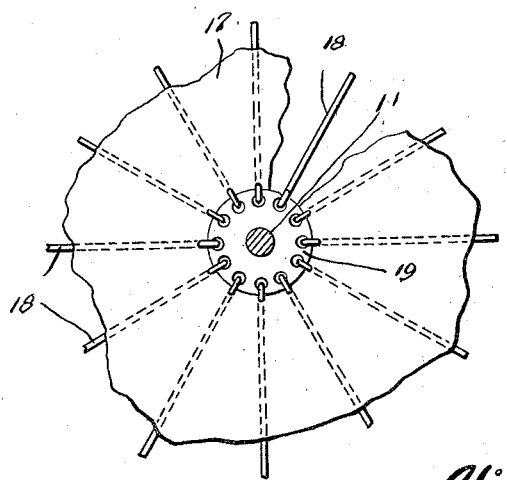
Figure 3 is a fragmentary view of the parachute.

The body of the parachute is indicated at 17, and is supported by ribs 18 which are pivotally associated with a ring 19 secured to the section 11, so that the parachute can be opened and closed in the usual manner. Carried by the section 11 and arranged above the ring 19 is a perforated collar 20 which supports a plurality of coiled springs 21, and to each of these springs is secured one end of a flexible element 22. The opposite ends of these elements are secured to the body 17 of the parachute at an appropriate point above the edge thereof, the construction being such that when the parachute is moved to a vertical position as shown in Figure 2, the springs 21 function to automatically open the parachute for use. Secured to the inside of the body 17 of the parachute is a band 22 constructed of any suitable flexible material, while secured to the lower end of the body 17 is a plurality of flexible elements 23. These elements and their corresponding extremities are secured to the perforated collar 24 carried by the section 10 of the staff, and are utilized to hold the body 17 of the parachute in its proper position for use. As shown in Figures 3 and 4, the parachute 17 is formed with a depending wall 25 to assist the parachute in holding air as will be readily understood. A wall 25 is formed when the parachute is opened, by reason of the connection between the lower end of the body 17 and the collar 24.

In practice, the parachute is normally arranged in the position illustrated in Figure 1, and when its use is desired the lever 14 is operated to release the section 11 of the shaft, thereby permitting the spring 12 to move the section 11 of the staff to a vertical position. As soon as the section 11 assumes this position, the springs 21 function to automatically open the parachute, during which time the wall 25 is formed for this purpose.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A parachute for aeroplanes comprising a staff including a fixed section rising vertically from the plane and secured thereto, and a movable section pivoted on the upper end of the fixed section and normally arranged horizontally, means for holding the latter mentioned section together with the body of the parachute horizontally, a coiled spring connected to the plane and to the adjacent end of the movable section for automatically moving the latter to a vertical position when released, a sleeve carried by the movable section and adapted to slide over the joint between said sections when the latter are aligned in a vertical position, a perforated collar carried by the movable section adjacent the upper end thereof, a plurality of coiled springs associated with said collar and a plurality of flexible elements having corresponding extremities secured to the adjacent ends of said springs and the outer edge of said parachute body for automatically opening the latter incident to the release of said movable section.

2. A parachute for aeroplanes comprising a staff including two sections, one of said sections being fixed to the plane and rising therefrom; the other section being movable and pivoted to the upper end of the first section, a parachute body carried by the movable section and normally collapsed, means for holding the movable section and said parachute body in a horizontal position, means for releasing said movable section, a coiled spring terminally secured to the plane and to the adjacent end of the movable section, for automatically moving the latter to a vertical position when released, spaced perforated collars secured to the movable section, coiled springs secured to one of said collars, flexible elements secured to the springs and to the free end of the parachute body for automatically opening the latter when the movable section assumes a vertical position, an additional perforated collar secured to the fixed section of the staff, and flexible elements connected to the latter mentioned collar, and to the remaining perforated collar carried by the movable section for the purpose specified.

In testimony whereof I affix my signature.

HENRY J. CHANDLER.